Patented Nov. 4, 1952

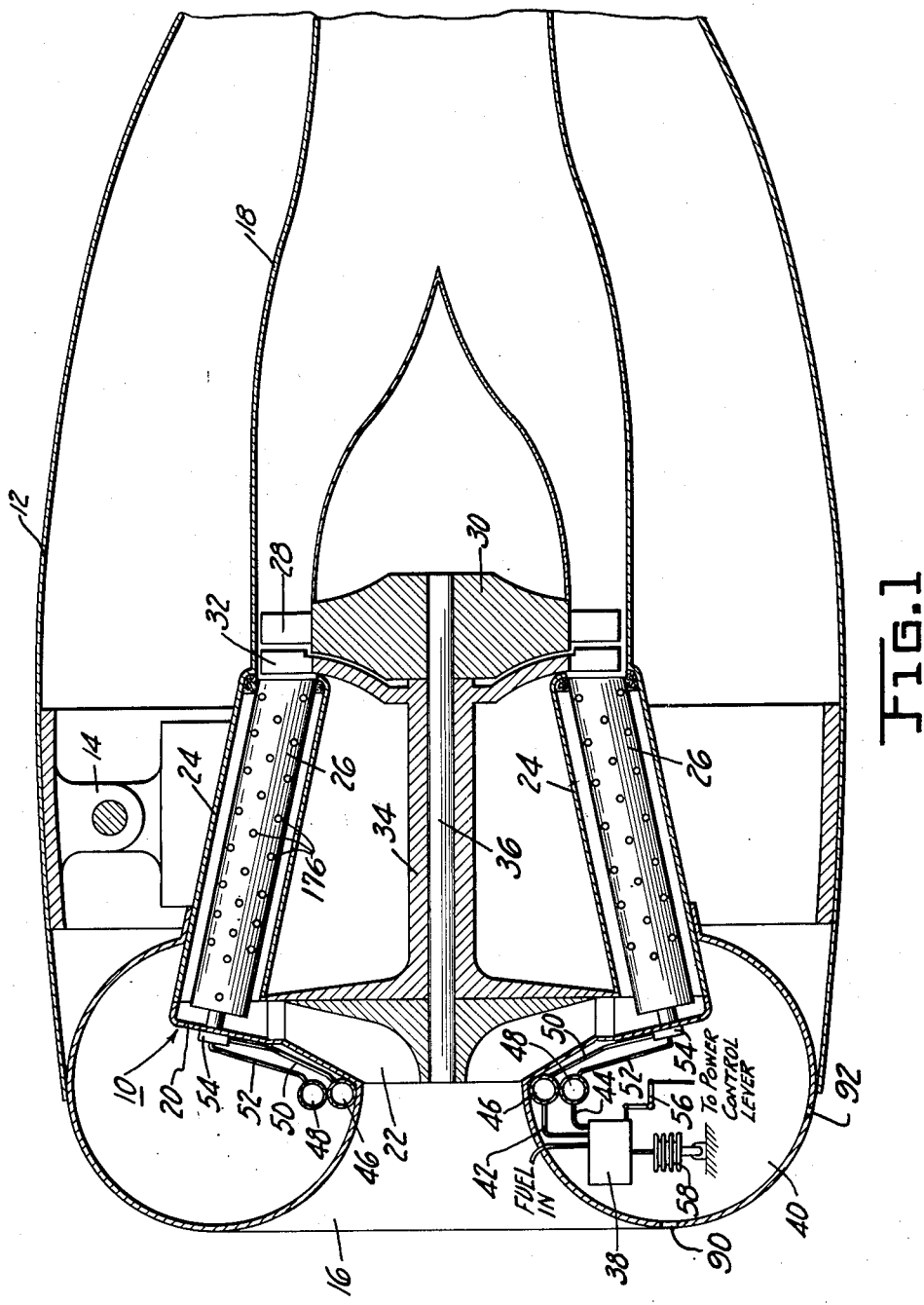

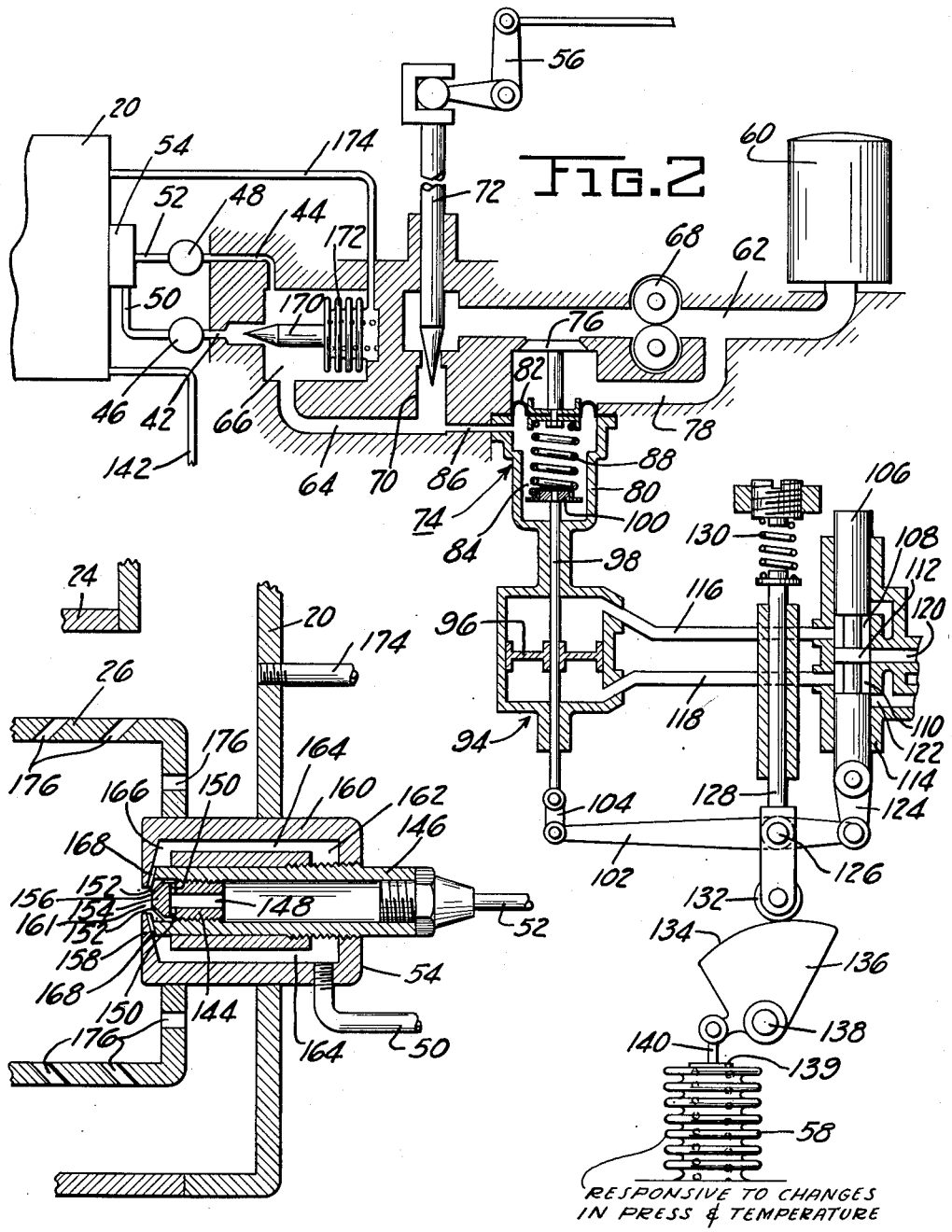

2,616,254

UNITED STATES PATENT OFFICE

2,616,254

JET ENGINE FUEL CONTROL FOR MODIFYING FUEL PRESSURE DROP ACROSS THROTTLE IN ACCORDANCE WITH ALTITUDE

Frank C. Mock, South Bend, Ind., assignor to Bendix Aviation Corporation, South Bend, Ind., a corporation of Delaware Application January 4, 1945, Serial No. 571,237

4 Claims. (Cl. 60—39.28)

This invention relates to a fuel feeding apparatus and more particularly to an arrangement for controlling the flow of fuel to a gas turbine, jet propulsion apparatus or other power plant of the type which may utilize the energy of combustion and expansion of a fuel mixture for the propulsion of aircraft.

One of the objects of the present invention is to provide a novel apparatus for controlling the delivery of fuel to a gas turbine of the type wherein a combustible mixture is ignited and burned, and the expanding gases may be utilized for the propulsion of aircraft.

Another object is to provide a fuel controlling device of the foregoing character wherein the metering of fuel is effected in such a manner as to maintain the speed of the turbine substantially constant, at a selected throttle position, irrespective of variations in altitude.

A further object comprehends the regulation of the delivery of fuel in a novel and improved manner and including the variation of the quantity of fuel conducted to the turbine in accordance with a function of changes in air density, thereby achieving a highly efficient control of the combustible mixture and securing optimum turbine performance throughout wide ranges of operating conditions.

A further object resides in the provision of a fuel regulating apparatus for use with a gas turbine of the foregoing character, which will be entirely automatic in operation, while retaining the usual power control mechanism or throttle operable by the pilot for varying the turbine speed.

Still another object is to provide a novel apparatus for automatically regulating the liquid fuel supply to a gas turbine without requiring the regulation of the air supply, thus securing an unusually efficient operation of the generating units.

A still further object includes a novel structural arrangement for securing a highly improved efficiency of operation of a gas turbine of the foregoing type.

Other objects and novel features of the invention will appear more fully hereinafter from a consideration of the following detailed description when taken in connection with the accompanying drawings illustrative of the novel apparatus constituting the invention. It is to be expressly understood, however, that the drawings are employed for purposes of illustration only and are not designed as a definition of the limits of the invention, reference being had for this purpose to the appended claims.

Referring to the drawings, wherein similar reference characters refer to similar parts throughout the several views:

Fig. 1 is a longitudinal sectional view of a gas turbine or power plant illustrating the novel fuel control mechanism of the present invention;

Fig. 2 is a diagrammatic view of the fuel control mechanism showing the relationship of the various parts thereof; and Fig. 3 is an enlarged sectional view of a portion of the nozzle and burner tube of the fuel control mechanism of Figs. 1 and 2.

A fuel controlling apparatus constructed in accordance with the present invention is illustrated in Figure 1 as being associated with a jet propulsion apparatus 10 suitably mounted on an aircraft engine nacelle 12 as by means of a suitable support 14. The nacelle 12 is provided with an inwardly directed air inlet 16, and an outlet 18, the latter being shaped in such a manner as to provide a reaction or exhaust member for conducting the expanding gases to the atmosphere to provide a propulsive effect.

The jet propulsion apparatus 10 more particularly includes an inlet manifold 20 for receiving compressed air from a compressor 22 and for delivering the air to a plurality of generators 24, arranged about the longitudinal axis of the nacelle 12, each of the generators including a burner unit 26, and all of the generators directing the gaseous products of combustion issuing therefrom, against the blades 28 of a turbine 30. Preferably, a set of stationary blades 32, mounted upon a stationary support 34 is provided for directing the gases against the blades 28 in order to secure the desired directive flow of such gases for maximum efficiency. As shown, the turbine 30 is so arranged as to synchronously drive the compressor 22, a shaft 36 mounted to rotate in support 34, being drivably connected with the turbine and compressor for this purpose.

In order to control the flow of fuel to the burner units 26, a novel control assembly 38 is provided, the assembly being suitably mounted in a chamber 40 of the nacelle 12 and being adapted to supply liquid fuel under pressure through conduits 42 and 44 to concentrically arranged fuel headers 46 and 48 respectively, the latter being provided with outlet conduits 50 and 52 for conducting fuel to two-stage fuel nozzles 54. It will be understood that each of the burner units 26 is provided with a nozzle 54 and that each of the latter is connected with the headers 46 and 48 through the conduits 50 and 52. As shown, the control assembly includes a power control or throttle lever 56 which may be controlled by the pilot in any suitable manner in order to vary the quantity of fuel conducted to the burner units, and such assembly also includes a barometric control unit 58 for securing a variation in the fuel flow in a manner which will appear more fully hereinafter.

The novel control mechanism of the present invention is more particularly illustrated in Figure 2, wherein fuel from a suitable source 60 is conducted to the headers 46 and 48 by means of interconnected conduits 62 and 64, the latter communicating with a valve chamber 66 from which the conduits 42 and 44 conduct fuel to the respective headers. Means are provided for supplying fuel under pressure from the source 60 to the nozzles 54, and as shown, such means includes a suitable pump 68, positioned within the conduit 62, and which may be driven from the power shaft 36 in any convenient manner, not shown. In order that the pilot may readily control the fuel flow, a metering restriction or orifice 70 is interposed between the conduits 62 and 64, and a suitable needle valve 72, connected with the power control lever or throttle 56, is mounted to cooperate with the restriction in order to vary the size thereof. Thus, by varying the position of the control lever 56, the pilot may change the effective area of the restriction 70 for the purpose of varying the quantity of fuel conducted to the burner units 26, thus causing a variation in the speed of rotation of the turbine 30 and consequent change in the speed of the aircraft.

One of the features of the present invention resides in a novel arrangement for automatically controlling the flow of fuel to the burner units 26 with any given setting of the power control lever 56, in such a manner as to maintain the speed of rotation of the turbine 30 substantially constant, regardless of variations in atmospheric density. Thus at a given turbine speed and a given rate of fuel feed as determined by the power lever setting, and with the aircraft at a predetermined altitude, it will be understood that as the aircraft ascends, a decreased weight of air would be delivered to the generators which at the given rate of fuel feed would result in an increase in turbine or engine speed. Under these conditions, the arrangement of the present invention is such that a decreased amount of fuel is delivered and for engines of the type for which the herein-disclosed fuel system is adapted, the fuel required to maintain a given speed has been found to vary approximately in direct proportion to the entering air density.

As shown, the aforesaid automatic control includes a pressure responsive device 74 which is so arranged as to be subjected not only to the pressure differential existing across the restriction 70, but also to the action of the air density device 58. More particularly, the device 74 includes a poppet valve 76 movable to variably control a by-pass connection 78 from the outlet to the inlet of the pump 68, the valve being housed within a suitable casing 80, and being connected to a pressure-responsive diaphragm 82 having substantially the same effective area as the head of the poppet valve. The casing 80 includes a chamber 84 below the diaphragm 82, which is constantly subjected to the pressure of the fuel on the downstream side of the restriction 70, through a conduit 86 connecting the chamber 84 with the conduit 64. Resilient means, such as a spring 88 serves to variably load the diaphragm 82 as a function of variations in air density, in a manner which will appear more fully hereinafter, and in so doing variably controls the differential pressure across orifice 70 as a function of air density.

For the purpose of variably loading the spring 88 as a function of air density, the device 58 is constituted by any suitable aneroid capsule which responds to variations in barometric pressure and atmospheric temperatures, and may be mounted within the chamber 40, Figure 1, suitable openings 90 and/or 92 being provided in the chamber wall so that the atmosphere therein reflects variations in the outside air density. As shown, movements of the device 58, in response to variations of air density, are transmitted to the spring 88 by means of any suitable type of torque amplifying mechanism 94. In the form of the invention illustrated, the mechanism 94 comprises a hydraulic servo piston 96 having a piston rod 98 extending upwardly into chamber 84 and provided with a plate or support 100 forming an abutment for one end of the spring 88, the opposite end of the piston rod being pivotally connected to one end of a lever 102 through a link 104. Fluid under pressure is conducted to and from opposite sides of the piston 96 by a control valve 106 having valve chambers 108 and 110 separated by a land 112, the valve being housed within a casing 114, provided with outlet conduits 116 and 118, associated with opposite sides of the piston 96, and being provided also with a fluid pressure inlet 120 and an outlet or exhaust 122. Lever 102 is pivotally connected through a link 124 with one end of the valve 106, and is pivotally connected intermediate its ends at 126, with a fulcrum rod 128, the latter being normally resiliently urged to the position shown as by means of a spring 130. The fulcrum rod is extended below the connection 126 and is provided with a roller 132 adapted to contact the face 134 of a cam 136, the latter being pivotally mounted on a stationary part 138, and being adapted to be moved about the pivotal mounting by a movable wall 139 of the device 58, through a link 140 connected therewith.

With the aforementioned construction it will be readily perceived that any change in air density will affect the loading of the spring 88. Thus should the air density increase, the device 58 tends to collapse, and movement of wall 139, will through the cam 136, move the fulcrum rod 128 upwardly. During such movement, the end of lever 102 connected with the piston 96 tends to remain stationary and hence the valve 106 is moved upwardly to conduct fluid pressure from the inlet 120 to the space below the piston 96 by way of chamber 110 and conduit 118. Simultaneously therewith, the space above the piston is connected with the outlet 122 by way of conduit 116 and chamber 108. Thus the piston 96 moves upwardly to increase the loading of the spring 88.

During such upward movement, the valve 106 is moved to a lapped position, and if no further change in air density occurs, the parts will occupy the new position. This will be readily understood when it is considered that as the piston 96 moves upwardly, the lever 102 pivots about the connection 126 and moves the valve 106 downwardly to the lapped position shown. It will also be perceived that in the event the air density decreases and the device 58 expands, the fulcrum rod 128 will be moved downwardly under the action of spring 130, in maintaining the roller 132 against the cam face 134, and the valve 106 will be moved downwardly to supply fluid pressure above the piston 96. Movement of the latter reduces the loading of the spring 88, and as in the previously described condition, the parts will be arrested in the new position, as determined by the movable wall of the air density device 58. It will be readily observed therefore, that the loading of the spring 88, and the effect of the latter in controlling the by-passing of liquid fuel around the pump may be readily controlled by movements of the air density device 58, and that any desired variation in the loading may be secured by imparting to the cam face 134 the proper profile.

In considering the action of the above-described pressure-responsive device 74, it should be borne in mind that the quantity of liquid fuel flowing past the restriction 70 to the burner units, at any selected position of the valve 72, is determined by the pressure differential across the restriction. With the arrangement proposed, such pressure differential is determined by the action of the pressure-responsive device 74 in by-passing fuel around the pump, and the action of the device 74 is modified in accordance with a function of variations in air density. Hence the head effective to control fuel flow to the burners, and the quantity of the fuel delivered, with a selected position of valve 72, is a function of air density. It will be apparent that with such a control, flow regulation and calibration are unaffected by change in size or restriction in the nozzle structure downstream from the metering orifice 70. Also, a given change in the loading of spring 88 will produce a fixed percentage change in the fuel flow past orifice 70 irrespective of the position of valve 72.

In order to effectively control the flow of fuel from the nozzles 54 under various conditions of pressure, each nozzle preferably comprises a two-stage structure which is so constituted that one jet is open under all conditions of operation, while a second jet is only opened when certain predetermined pressure differential conditions exist. As shown, Fig. 3, the nozzle 54 includes a jet 144, having free communication with the header 48, through a sleeve 146 connected with conduit 52 and being provided with a central opening 148 connected with a plurality of radially extending ducts 150, the latter communicating at their outer ends with a series of grooves 152. These latter are preferably formed tangentially on the tapered end 154 of the jet so that the fuel issuing from the grooves 152 will be given a swirling motion as it passes through the orifice 156, formed in the tapered end 158 of sleeve 146, into the burner unit. The size of the orifice 156 is such as to accommodate all of the fuel flow under idling conditions of operation.

Concentrically arranged with respect to the jet 144 is a nozzle body 160 provided with a discharge orifice 161 to which fuel is conducted from the header 46 by way of conduit 50, chambers 162, 164, 166 and grooves 168. Preferably the grooves 168 are arranged tangentially in the tapered end 158 of the sleeve 146 so that the fuel issuing from the grooves 168 also has imparted thereto a swirling movement as it passes through the orifice 161.

Means are provided for cutting off communication between the discharge orifice 161 and the fuel conduit 64 when the turbine is operating at normal idling speed and establishing such communication when the speed rises above the idling or some relatively low value. As shown, such means comprises a valve 170, normally urged to close communication between conduit 42 and chamber 66, as by a suitable pressure-responsive device 172 mounted upon one wall of the chamber. The interior of the device 172 is constantly subjected to the pressure within the generator 24 through a conduit 174, and since the exterior of the device is subjected to the fuel pressure within the chamber 66, it will be readily understood that when the pressure differential acting on the device 172 reaches a predetermined value, as determined by the characteristics thereof, the valve 170 will open and the fuel supply issuing from the jet 144 will be supplemented by that supplied by way of the nozzle body 160. Thus during idling conditions, when the fuel requirements of the burner are low, fuel is supplied through the idling jet 144. On the other hand, when additional fuel is required, the valve 170 will open and supply fuel to the nozzle body 160 upon a predetermined rise in the pressure differential existing between the fuel supply conduit 64 and the interior of the generator.

An important aspect of the present invention, as heretofore pointed out resides in the control of the flow of fuel to the generators, at any given throttle control position, as a function of air density, and as has been previously described, the cam 136 may be so constituted that the spring 88 may be variably loaded through the operation of the air density device 58 to secure any desired responsive movement. For example, the cam face 134 may be so profiled, and arranged with respect to the connections to the spring 88, as to effect a variable loading of the latter in accordance with variations in movements of the device 58 in order to secure a linear relationship between the pressure differential across orifice 70 and movements of said device. On the other hand, the relation of movement between these parts may be such that the pressure differential across restriction 70, at any given throttle valve setting is controlled so as to vary in accordance with a function of the air density where the latter is raised to a power greater than one or is controlled as a non-linear function of the air density. Preferably, the arrangement is such that the aforesaid pressure differential varies substantially as the square of the air density, and the cam 136 may be constructed with a substantially parabolic contour so as to load spring 88 in proportion to the square of the movement of capsule 58 to secure this result. With such an adjustment, the quantity of fuel delivered to the burners varies directly with the air density, thus securing substantially constant turbine speed at any given throttle setting, irrespective of variations in altitude.

In operation, it will be understood that the turbine cycle is started in any suitable manner, such as by rotating the shaft 36 and igniting the fuel mixture within the burner units 26. With the control lever 56 in a position corresponding to normal idling, fuel is conducted from the pump 68 to the header 48 and thence to the burner units 26 by way of conduits 62, 64, chamber 66, conduits 44 and 52, and jet 144, it being understood that the air compressed by the compressor 22, due to operation of the turbine 30 is conducted to the manifold 20 and through openings 176 to the interior of the burner units 26, where it mixes with the fuel issuing from the orifice 161 to form the combustible mixture. The expanding gases resulting from the burning of such mixture are directed to the blades 28 to rotate the turbine 30, and thereafter these gases are conducted to the atmosphere by way of outlet 18 to secure the desired jet propulsive effect.

Under the above mentioned idling conditions, at a pressure corresponding to sea level, the fuel delivered to the conduit 64 will be automatically controlled by operation of the pressure-responsive device 74, in order to maintain constant the pressure differential across the restriction 70. It will also be understood that such pressure differential is likewise maintained constant, assuming that no change in barometric pressure is effected, in the event that the size of the restriction 70 is varied by opening the valve 72. This feature will be understood when it is considered that the valve 76 and diaphragm 82 of the device 74 are respectively subjected to the action of the fuel pressures in conduits 62 and 64, the spring 88 acting on the diaphragm and valve assembly to control the pressure differential. Thus if the pressure in either conduit tends to vary, the valve 76 will move to control the by-passing of fuel to reestablish the desired differential.

In the event that the valve 72 is opened wider, the pressure of the fuel in conduit 64 and chamber 66 will increase, and in a manner heretofore described, when the pressure differential between chamber 66 and the generator 24 reaches a predetermined value, the valve 170 opens and additional fuel is conducted to the burner units through nozzle body 160 and discharge orifice 161. Thus the fuel quantity available for mixing with the air is augmented under these conditions.

Due to the use of the air density device 58, any change of altitude of the aircraft will effect a variation of the loading of the spring 88 acting upon the diaphragm 82 and thus the characteristics of the pressure-responsive device 74 will vary. Thus in the event that the altitude is decreased, assuming that the setting of the control lever 56 is not changed, the device 58 contracts and movement of the wall 139 thereof will, through the torque amplifying mechanism 94, increase the loading of the spring 88. This has the effect of increasing rather rapidly the force tending to close the valve 76 and increases the pressure differential across the restriction 70 which in turn causes an increased amount of fuel to flow to the burner units. Such increase of fuel results in maintaining the speed of the turbine substantially constant at the lower altitude. In like manner, increase of altitude and consequent expansion of the device 58, reduces the loading of spring 88, thus decreasing the pressure differential across the restriction 70 and decreasing the flow of fuel to maintain constant turbine speed under the given conditions. Thus with a given position of the control lever 56, the pressure differential across orifice 70 is governed as a function of air density, and as previously pointed out, is preferably regulated in accordance with the square of the air density, thus varying the fuel flow directly as density and securing substantially constant turbine speed.

It will be understood that while in the foregoing, reference has been made to the operation of that form of the invention wherein the device 74 is subjected to the pressures across the restriction 70, it will be understood that the form wherein the chamber 84 is subjected to the pressure within the generator 26 functions in a like manner to vary the quantity of fuel delivered to the burners in accordance with variations in air density. The only difference between the two forms is the manner of application of differential pressures to the device 74. The results obtained in the control of the quantity of fuel delivered to the burner units is the same in each instance.

While the invention has been shown and described herein with considerable particularity, it will be understood that various changes and rearrangements may be made therein, as will be apparent to those skilled in the art, without departing from the scope of the invention. Reference will therefore be had to the appended claims for a definition of the limits of the invention.

What is claimed is:

1. In a system for feeding liquid fuel to the combustion chamber of a gas turbine engine, a fuel conduit for supplying fuel under pressure to said chamber having a metering restriction therein, a manually operable power control valve for controlling said metering restriction, and means for automatically varying the quantity of fuel flowing past said restriction at any selected position of said valve in relation to changes in density of the air flowing to the engine including a pressure-responsive device effective to relieve the pressure on the upstream side of said restriction, means for subjecting said device to the pressure differential across said restriction, control means for said pressure-responsive device movable to different effective control positions in response to changes in air density, and means for variably loading said device in accordance with the position of said control means.

2. In a fuel feeding device for supplying liquid fuel to an engine, a fuel conduit, a manually controlled restriction in the conduit, a fuel pump in the conduit anterior to the restriction, a by-pass around said pump, a spring closed valve in the by-pass, means for variably loading the spring including a capsule responsive to changes in density of the air flowing to the engine and a connection between the capsule and spring including a parabolically contoured cam.

3. In a system for feeding liquid fuel to the combustion chamber of a gas turbine engine, an atomizing nozzle for spraying fuel into said chamber, a fuel conduit for supplying fuel under pressure to said nozzle, a metering restriction in said conduit upstream of said nozzle, a manually operable throttle valve for adjusting the area of said restriction, and means for automatically controlling the rate of fuel feed in proportion to engine inlet air density at fixed positions of said throttle valve including a device movable to different positions to vary the pressure drop across said restriction, a servo-motor for controlling said device, control means for said servo-motor, and means responsive to changes in density of the air flowing to the engine for regulating said servo-motor control means.

4. In a device for supplying fuel to an engine, a fuel conduit having a metering restriction therein, fuel-pressurizing means in the conduit anterior the restriction, a by-pass communicating the high pressure side of said means with a low pressure source, a valve controlling said bypass, resilient means normally urging said valve to closed position, and means for variably loading said resilient means comprising a device movable in response to changes in density of the air flowing to the engine and a connection between said device and resilient means including a contoured cam responsive to movement of said device.

FRANK C. MOCK.

REFERENCES CITED

The following references are of record in the file of this patent:

UNITED STATES PATENTS

| Number | Name | Date |
|---|---|---|
| 2,008,143 | Mock | July 16, 1935 |
| 2,085,761 | Lysholm | July 6, 1937 |
| 2,136,959 | Winfield | Nov. 15, 1938 |
| 2,165,447 | Browne | July 11, 1939 |
| 2,264,375 | Hill | Dec. 2, 1941 |
| 2,280,835 | Lysholm | Apr. 28, 1942 |
| 2,315,715 | Leibing | Apr. 6, 1943 |
| 2,348,113 | Davis | May 2, 1944 |
| 2,405,888 | Holley | Aug. 13, 1946 |
| 2,406,973 | Trisler | Sept. 3, 1946 |
| 2,407,115 | Udale | Sept. 3, 1946 |
| 2,429,489 | Roth | Oct. 21, 1947 |

FOREIGN PATENTS

| Number | Country | Date |
|---|---|---|
| 560,196 | Great Britain | Mar. 24, 1944 |

OTHER REFERENCES

Ser. No. 394,322, Gosslau et al. (A. P. C.), published May 25, 1943.